(12) United States Patent
McCorkle

(10) Patent No.: US 8,165,243 B2
(45) Date of Patent: Apr. 24, 2012

(54) METHOD AND SYSTEM FOR GENERATING WAVELETS

(75) Inventor: John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/801,610

(22) Filed: Jun. 17, 2010

(65) Prior Publication Data

US 2010/0253411 A1  Oct. 7, 2010

Related U.S. Application Data

(62) Division of application No. 11/237,752, filed on Sep. 29, 2005, now Pat. No. 7,769,112.

(51) Int. Cl.
*H04L 27/00* (2006.01)
*G06F 7/44* (2006.01)

(52) U.S. Cl. ........................ 375/295; 327/356

(58) Field of Classification Search ................. 327/356; 375/295
See application file for complete search history.

(56) References Cited

U.S. PATENT DOCUMENTS

| | | | |
|---|---|---|---|
| 5,745,769 A * | 4/1998 | Choi | 710/220 |
| 6,366,148 B1 * | 4/2002 | Kim | 327/262 |
| 6,486,813 B1 | 11/2002 | Koyanagi et al. | |
| 2002/0105912 A1 | 8/2002 | Krishnamachari et al. | |
| 2002/0125960 A1 * | 9/2002 | Pickering | 331/25 |
| 2002/0163957 A1 * | 11/2002 | Jung | 375/149 |
| 2003/0042958 A1 * | 3/2003 | Sanduleanu | 327/238 |
| 2004/0013187 A1 | 1/2004 | Tokunaga | |
| 2004/0063416 A1 | 4/2004 | Kuenen et al. | |
| 2005/0002676 A1 | 1/2005 | Zitelli | |
| 2005/0201287 A1 | 9/2005 | Welborn | |
| 2006/0238260 A1 * | 10/2006 | Demma | 331/10 |
| 2007/0071137 A1 | 3/2007 | McCorkle | |
| 2007/0182424 A1 | 8/2007 | Benedikt et al. | |

OTHER PUBLICATIONS

Office Action issued by the U.S. Patent Office on Sep. 2, 2008 in connection with related U.S. Appl. No. 11/237,752.
Office Action issued by the U.S. Patent Office on Jun. 18, 2009 in connection with related U.S. Appl. No. 11/237,752.
Final Office Action issued by the U.S. Patent Office on Dec. 16, 2009 in connection with related U.S. Appl. No. 11/237,752.
Notice of Allowance issued by the U.S. Patent Office on Mar. 24, 2010 in connection with related U.S. Appl. No. 11/237,752.

* cited by examiner

*Primary Examiner* — David C. Payne
*Assistant Examiner* — Brian J Stevens

(57) ABSTRACT

A method (1300) is provided for generating one or more waveforms (130, 140). The method includes: generating a first toggle signal (1130, 1330) in response to a clock signal (1110), the first toggle signal having one of a first positive shape, a null shape, and a first negative shape for each cycle of the clock signal; multiplying the first toggle signal by a first coefficient signal to create a first intermediate signal (1440); generating a second toggle signal (1140, 1330) in response to the clock signal, the second toggle signal having one of a second positive shape, the null shape, and a second negative shape for each cycle of the clock signal; multiplying the second toggle signal by a second coefficient signal to create a second intermediate signal (1440); and generating a first output signal (1170) by adding the first intermediate signal and the second intermediate signal together (1350).

14 Claims, 13 Drawing Sheets

METHOD AND SYSTEM FOR GENERATING WAVELETS

CROSS REFERENCE TO RELATED APPLICATIONS

This application a divisional application of U.S. patent application Ser. No. 11/237,752 filed on Sep. 29, 2005 entitled "METHOD AND SYSTEM FOR GENERATING WAVELETS".

FIELD OF THE INVENTION

The present invention relates in general to the operation of a wireless network, particularly to a circuit or method that can be used to generate waveforms, and more particularly, to a circuit or method that can be used to generate quadrature-phase shift key (QPSK) signal.

BACKGROUND OF THE INVENTION

Quadrature-phase shift keying (QPSK) is a modulation scheme that encodes data into one of four phase values for a carrier signal. Since there are four possible phase values, two data bits can be encoded into each modulated signal. Typically the four phase values are ninety degrees apart from each other, e.g., 0°, 90°, 180°, and 270°, or 45°, 135°, 225°, and 315°.

Conventional narrowband QPSK encoding is accomplished by using two separate carrier signals, which are used to encode an in-phase (I) path and a quadrature-phase (Q) path. The I and Q phase paths each have a separate stream of data encoded into them, and the resulting two data paths are added together to form a final QPSK signal. This final QPSK signal will have one of the four possible phase values, indicating the four possible bit value combinations, i.e., 00, 01, 10, or 11. This could be done using gray coding, natural coding, or any desired type of QPSK coding.

To function properly, the in-phase and quadrature-phase signals must be orthogonal to each other and must each have the same signal energy. If a function $f_I(t)$ defines a signal used for an I path, and a function $f_Q(t)$ defines a signal used for a Q path, then the requirement of orthogonality can be shown by Equation (1):

$$\int_{-\infty}^{\infty} f_I(t) \cdot f_Q(t) \cdot dt = 0 \qquad (1)$$

In other words, if the two signals are multiplied by each other and integrated over time, the result should be zero.

The requirement of equal energy can be shown by Equation (2):

$$\int_{-\infty}^{\infty} f_I^2(t) \cdot dt = \int_{-\infty}^{\infty} f_Q^2(t) \cdot dt \qquad (2)$$

In other words, if the two signals are each multiplied by themselves and integrated over time, the results should be equal. This means that regardless of whether you're encoding digital 1's or 0's into the two waveforms, they'll have the same energy and therefore the same signal-to-noise ratio at the receiver.

In a narrowband system, sine and cosine signals are typically used for $f_I(t)$ and $f_Q(t)$. And though it's hard to make these two signals perfectly orthogonal for any given transmission, they make a close approximation. A large number of cycles are used, and the signals are tapered off at the end, which makes the resulting waveforms close enough to orthogonal and close enough to having the same signal energy that the requirements of Equations (1) and (2) are met to within acceptable tolerances.

However higher bandwidth systems (e.g., wideband and ultrawide bandwidth systems) use very short duration signals (which may also be called symbols or waveforms) to pass a pair of data bits. The duration of these symbols is so short that sine and cosine signals will not fulfill the requirements of orthogonality and equal energy. Therefore, it is desirable to provide short-duration signals that are appropriate for encoding high-speed QPSK data.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

This invention is directed to any sort of network that needs to generate very short duration waveforms of the sort used for QPSK signals. One particular embodiment is a wireless ultra-wide bandwidth (UWB) network. However, it is equally applicable to other networks such as wideband networks. It is also applicable for generating short-duration waveforms for other signal types (e.g., QAM signals).

High Bandwidth QPSK Signals

As noted above, high bandwidth QPSK systems, such as wideband and ultrawide bandwidth systems, use very short duration in-phase and quadrature phase symbols to transmit data. In order to function properly, these symbols, or waveforms, must be both orthogonal to each other, and have equal signal energy, meeting the requirements of Equations (1) and (2) above.

Figure 1:
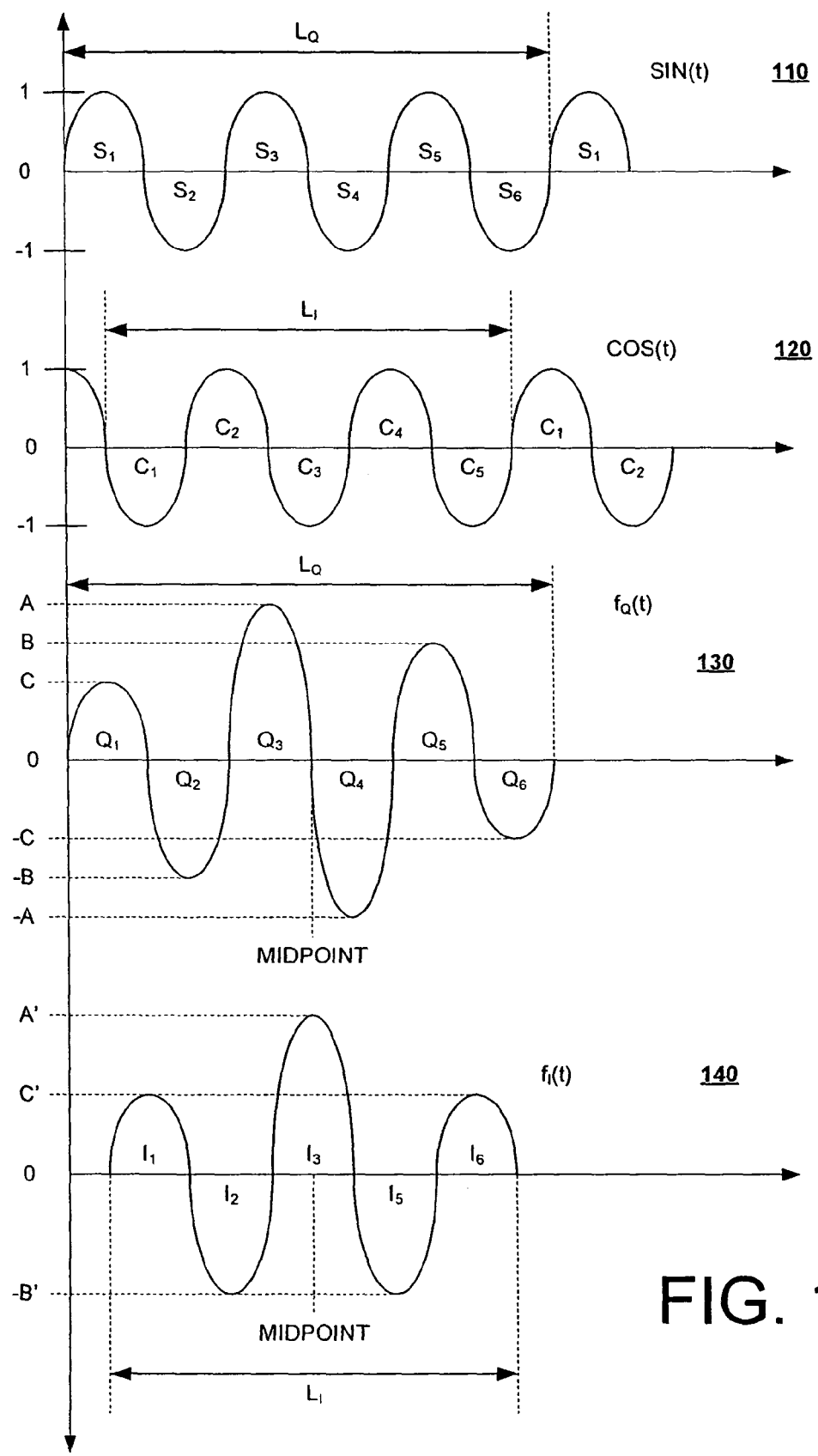
FIG. 1 is a graph showing exemplary in-phase and quadrature phase waveforms suitable for high bandwidth transmissions, according to a disclosed embodiment of the present invention.

FIG. 1 is a graph showing exemplary in-phase and quadrature-phase waveforms suitable for high bandwidth transmissions, according to a disclosed embodiment of the present invention. As shown in FIG. 1, an in-phase waveform 140 and a quadrature-phase waveform 130 can be derived from a sine wave 110 and a cosine wave 120

The quadrature-phase waveform 130 is formed from six half-cycles of the sine wave 110, each multiplied by a set coefficient value. A first section $Q_1$ of the quadrature-phase waveform 130 is formed by multiplying a first half-cycle $S_1$ of the sine wave 110 by a coefficient C; a second section $Q_2$ of the quadrature-phase waveform 130 is formed by multiplying a second half-cycle $S_2$ of the sine wave 110 by a coefficient $-B$; a third section $Q_3$ of the quadrature-phase waveform 130 is formed by multiplying a third half-cycle $S_3$ of the sine wave 110 by a coefficient A; a fourth section $Q_4$ of the quadrature-phase waveform 130 is formed by multiplying a fourth half-cycle $S_4$ of the sine wave 110 by a coefficient $-A$; a fifth section $Q_5$ of the quadrature-phase waveform 130 is formed by multiplying a fifth half-cycle $S_5$ of the sine wave 110 by a coefficient B; and a sixth section $Q_6$ of the quadrature-phase waveform 130 is formed by multiplying a sixth half-cycle $S_6$ of the sine wave 110 by a coefficient $-C$.

The in-phase waveform 140 is formed from six half-cycles of the cosine wave 120, each multiplied by a set coefficient value. A first section $I_1$ of the in-phase waveform 140 is formed by multiplying a first half-cycle $C_1$ of the cosine wave 120 by a coefficient $-C'$; a second section $I_2$ of the in-phase waveform 140 is formed by multiplying a second half-cycle $C_2$ of the cosine wave 120 by a coefficient $-B'$; a third section $I_3$ of the in-phase waveform 130 is formed by multiplying a third half-cycle $C_3$ of the cosine wave 120 by a coefficient $-A'$; a fourth section $I_4$ of the in-phase waveform 140 is formed by multiplying a fourth half-cycle $C_4$ of the cosine wave 120 by a coefficient $-B'$; and a fifth section $I_5$ of the in-phase waveform 140 is formed by multiplying a fifth half-cycle $C_5$ of the cosine wave 120 by a coefficient $-C'$.

The particular values of the coefficients A, B, C, A', B', and C' are chosen such that the resulting in-phase and quadrature-phase waveforms 130 and 140 meet the requirements of Equations (1) and (2) within the tolerances of the system, i.e., they are both either orthogonal to each other and have equal energy, or are close enough to meeting these two requirements that they will allow for an acceptable quality for signal transmission.

In alternate embodiments the polarity of the coefficients used to multiply the half-cycles of the sine and cosine waves 110 and 120 can be inverted. This will simply invert the in-phase waveform 140 and the quadrature-phase waveform 130, but the inverted waveforms will still meet the requirements of Equations (1) and (2).

Although in the embodiment disclosed in FIG. 1, the in-phase waveform 140 is shown as having six half-cycles and the quadrature-phase waveform 130 is shown as having five half-cycles, this is by way of example only. Alternate embodiments could use in-phase and quadrature-phase waveforms with more or fewer half-cycles. In this case more or fewer coefficients would be used. For example, if an in-phase waveform of ten half cycles and a quadrature-phase waveform of nine half-cycles were used, coefficients A, B, C, D, and E would be used for the in-phase waveform, and coefficients A', B', C', D', and E' would be used for the quadrature-phase waveform.

Furthermore, regardless of how many half-cycles are used for each waveform, the resulting coefficients should be selected such that Equations (1) and (2) above are satisfied, i.e., such that the in-phase waveform and the quadrature-phase waveform are orthogonal and have equal energy.

In addition, although FIG. 1 discloses the use of sine and cosine waves, alternate embodiments could generate the in-phase and quadrature-phase waveforms from any two other signals that meet the requirements of Equations (1) and (2). For example, two square waves that are ninety degrees out of phase, could be used, as could two triangle waveforms that are ninety degrees out of phase.

Figure 2:
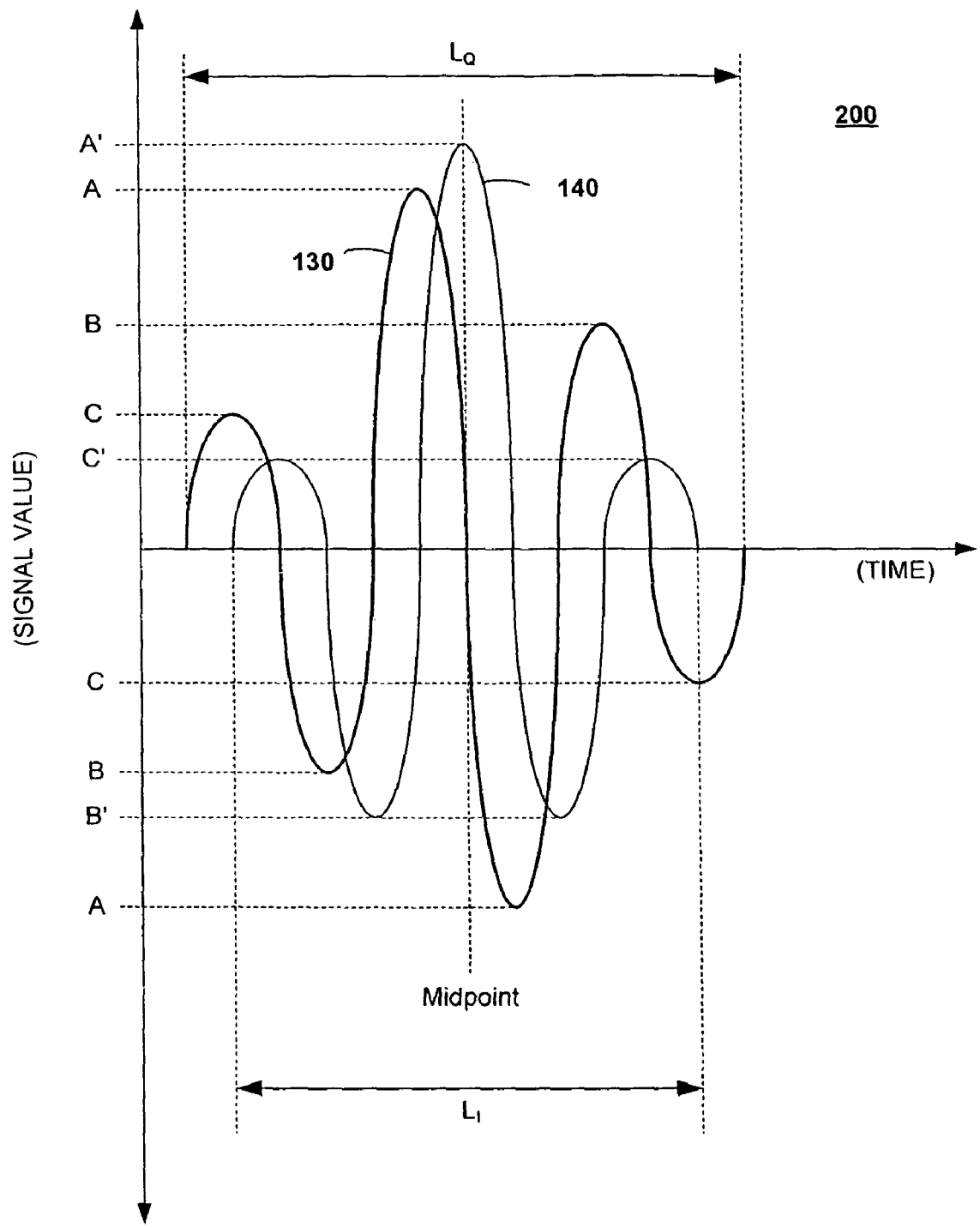
FIG. 2 is a graph showing the exemplary in-phase and quadrature phase waveforms of FIG. 1 superimposed on each other, according to a disclosed embodiment of the present invention.

FIG. 2 is a graph showing the exemplary in-phase and quadrature phase waveforms of FIG. 1 superimposed on each other, according to a disclosed embodiment of the present invention.

As shown in FIG. 2, when superimposed with the same midpoint, the quadrature-phase waveform 130 is anti-symmetrical around the midpoint, and the in-phase waveform 140 is symmetrical around the midpoint. Because one of these signals is anti-symmetrical and the other is symmetrical, they will meet the requirement of orthogonality from Equation (1). In other words, the product from the left side of the midpoint will always cancel out the product from the right side of the midpoint. Because they are based on sine and cosine waves, each time a segment of the in-phase or quadrature-phase waveform crosses zero, the other waveform is at a minimum or a maximum.

QPSK Signal Generation Circuit

Figure 3:
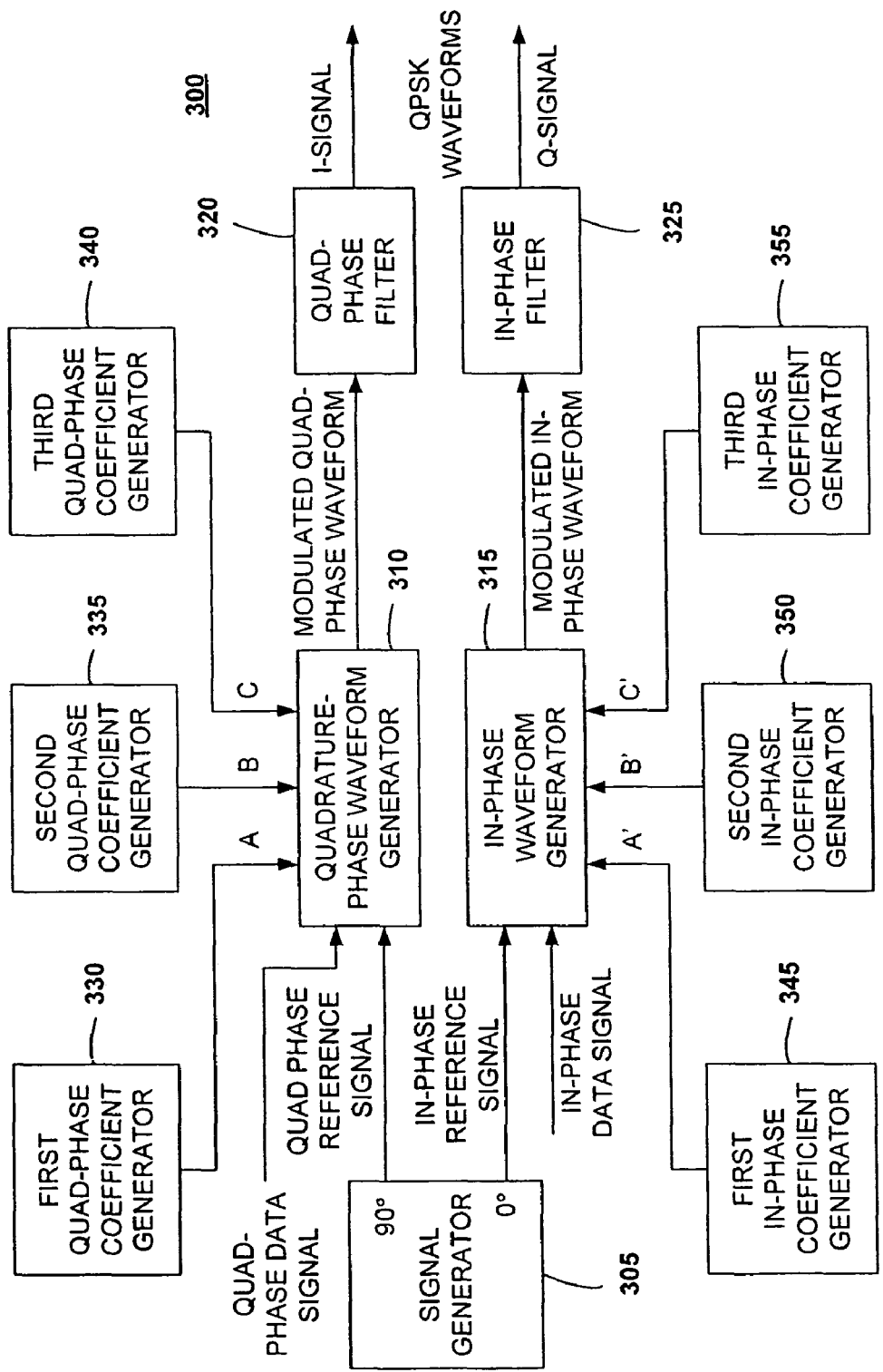
FIG. 3 is a block diagram of a circuit for generating the exemplary in-phase and quadrature phase signals of FIGS. 1 and 2, according to a disclosed embodiment of the present invention.

FIG. 3 is a block diagram of a circuit for generating the exemplary in-phase and quadrature-phase signals of FIGS. 1 and 2, according to a disclosed embodiment of the present invention. This shows one possible implementation for how to generate in-phase and quadrature-phase waveforms.

As shown in FIG. 3, the I and Q generation circuit 300 includes a signal generator 305, a quadrature-phase waveform generator 310, an in-phase waveform generator 315, a quadrature-phase filter 320, an in-phase filter 325, a first quadrature-phase coefficient generator 330, a second quadrature-phase coefficient generator 335, a third quadrature-phase coefficient generator 340, a first in-phase coefficient generator 345, a second in-phase coefficient generator 350, and a third in-phase coefficient generator 355.

The signal generator 305 generates two signals that are ninety degrees out of phase with each other as a quadrature-phase reference signal and an in-phase reference signal. These reference signals are used for generating the in-phase and quadrature-phase waveforms. These can be signals of many different shapes (e.g., square, triangular, sinusoidal, etc.), and the two signals need not be the same shape.

The quadrature-phase waveform generator 310 performs a piecewise multiplication of the quadrature-phase reference signal by the relevant quadrature-phase coefficients, as shown in FIG. 1, to create a quadrature-phase waveform. It also modulates the quadrature-phase waveform by a quadrature-phase data signal to generate a modulated quadrature-phase waveform The in-phase waveform generator 315, performs a piecewise multiplication of the in-phase reference signal by the relevant in-phase coefficients, as shown in FIG. 1, to create an in-phase waveform. It also modulates the in-phase waveform by an in-phase data signal to generate a modulated in-phase waveform.

In different embodiments the in-phase data signal and the quadrature-phase data signal could be binary-encoded data $\{+1, -1\}$, ternary-encoded data $\{+1, 0, -1\}$, or M-ary encoded data $\{+k, +(k-1), \ldots, +1, 0, -1, \ldots, -(k-1), -k\}$.

The quadrature-phase filter 320 is provided to filter out unwanted spectrum portions of the modulated quadrature-phase waveform that arise from the fact that the junctions between sections of the quadrature-phase waveform (e.g., $Q_1$-$Q_2$, $Q_2$-$Q_3$, etc.) are not continuous. In other words, the slopes of the waveform at either side of the junction point are not the same, but are different. This is because each section of the sine wave (i.e., $S_1$, $S_2$, etc.) is multiplied by a different coefficient.

The in-phase filter 325, is provided to filter out unwanted spectrum portions of the modulated in-phase waveform that arise from the fact that the junctions between sections of the in-phase waveform (e.g., $I_1$-$I_2$, $I_2$-$I_3$, etc.) are not continuous. In other words, the slopes of the waveform at either side of the junction point are not the same, but are different. This is because each section of the cosine wave (i.e., $C_1$, $C_2$, etc.) is multiplied by a different coefficient.

In an embodiment that employs reference signals that are themselves discontinuous, e.g., square waves or triangle waves, the quadrature-phase filter 320 and the in-phase filter 325 also serve to smooth out the undesired spectrum arising from these discontinuities as well.

Thus, the quadrature-phase filter 320 and the in-phase filter will round out any corners in their respective modulated waveforms and output between them a set of QPSK waveforms that are smoothed out and at least approximately orthogonal to each other.

In various embodiments the quadrature-phase filter 320 and the in-phase filter 325 can be implemented as any desired sort of filter. For example, they could be implemented on-chip with a state-variable active filter, with a lumped element LC filter, with a distributed coupled line filter, etc. The actual parameters of the filters 320 and 325 will depend upon the desired qualities of the output signals. In some embodiments this will mean that the quadrature-phase filter 320 and the in-phase filter 325 can be eliminated.

The first, second, and third quadrature-phase coefficient generators 330, 335, and 340, provide the quadrature-phase coefficients A, B, and C to the quadrature-phase waveform generator 310. Although shown as individual circuits, a single element could generate all of the coefficients.

The first, second, and third in-phase coefficient generators 345, 350, and 355 provide the in-phase coefficients A', B', and C' to the in-phase waveform generator 315. Although shown as individual circuits, a single element could generate all of the coefficients.

As noted above with respect to FIG. 1, the embodiment shown in FIG. 3 is for generating an in-phase waveform 140 with six half-cycles and a quadrature-phase waveform 130 with five half-cycles, and therefore employs three coefficients (and so three coefficient generators) for generating each waveform. Alternate embodiments could have in-phase and quadrature-phase waveforms with more or fewer half-cycles, requiring correspondingly more or fewer coefficients. The number of coefficient generators in FIG. 3 could therefore vary depending upon the precise waveforms used.

Coefficient Generators

Figure 4:
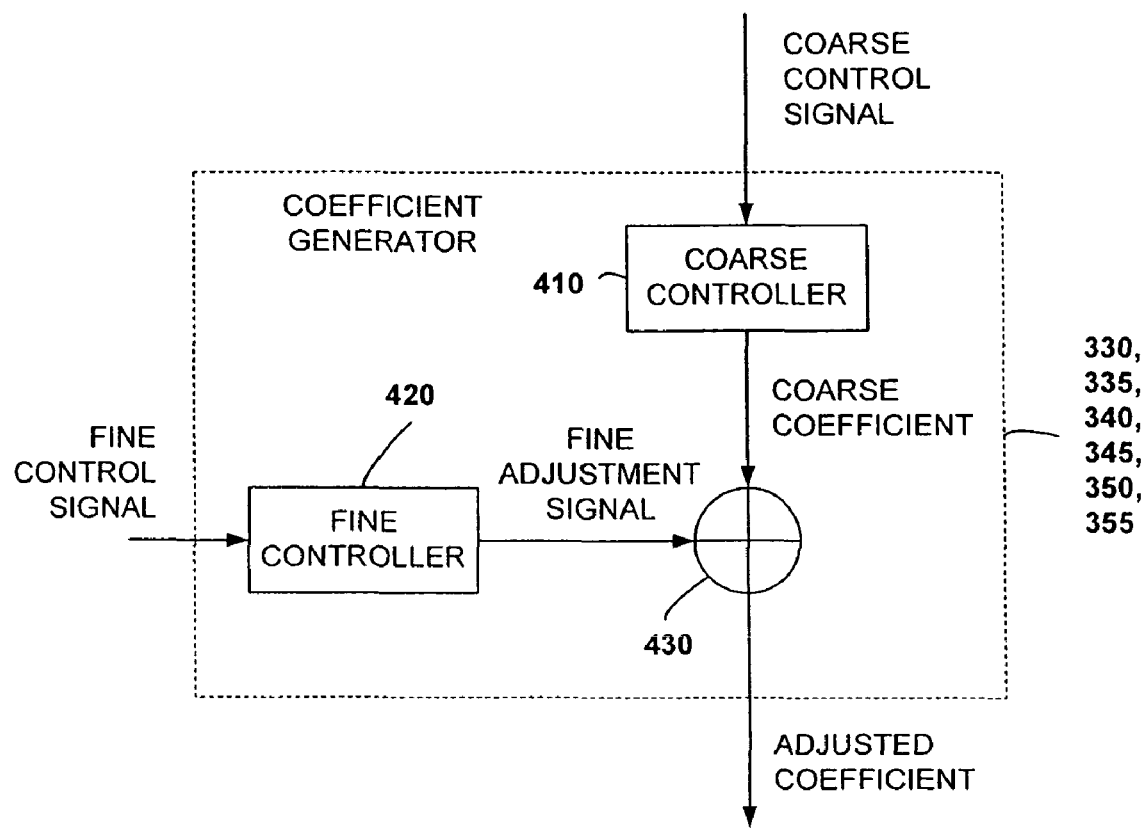
FIG. 4 is a block diagram of a coefficient generator of FIG. 3, according to a disclosed embodiment of the present invention.

FIG. 4 is a block diagram of a coefficient generator of FIG. 3, according to a disclosed embodiment of the present invention. As shown in FIG. 4, the coefficient generator 330, 335, 340, 345, 350, 355 includes a coarse controller 410, a fine controller 420, and an adder 430.

The coarse controller 410 stores a coarse coefficient received in a coarse control signal that represents an approximation of the final coefficient needed. This may, for example, be an estimated value for the coefficient that is considered close to the final value, but not necessarily exact. Or it could represent a desired coefficient that doesn't take into account imperfections in the I and Q generation circuit 300. In one embodiment the coarse controller could be a register or other memory device that stores the coarse coefficient. In another embodiment the coarse controller can simply be a digital-to-analog converter (DAC) that converts a digital coarse control signal to an analog coarse coefficient.

The fine controller 420 provides a fine adjustment signal in response to a fine control signal. This could be a dither to account for circuit imperfections, an adjustment to account for estimation errors in the coarse coefficient, etc. In one embodiment the fine controller can simply be a DAC that converts a digital fine control signal to an analog fine adjustment signal.

The adder 430 adds the coarse coefficient and the fine adjustment signal to generate an adjusted coefficient that is provided to the proper waveform generator 310, 315.

Alternate embodiments of the coefficient generators could employ just a coarse controller that provides an unadjusted coefficient.

Waveform Generators

Figure 5:
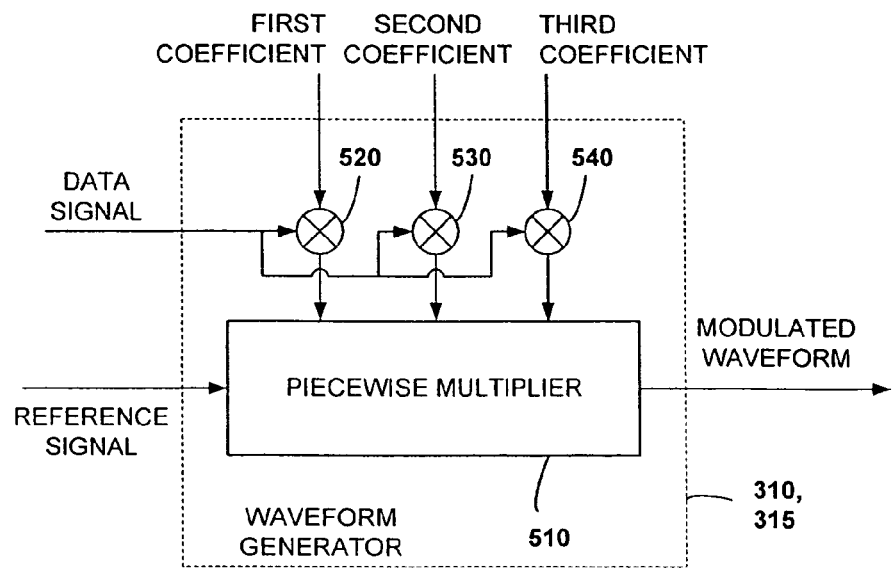
FIG. 5 is a block diagram of a waveform generator of FIG. 3, according to a one disclosed embodiment of the present invention.
Figure 6:
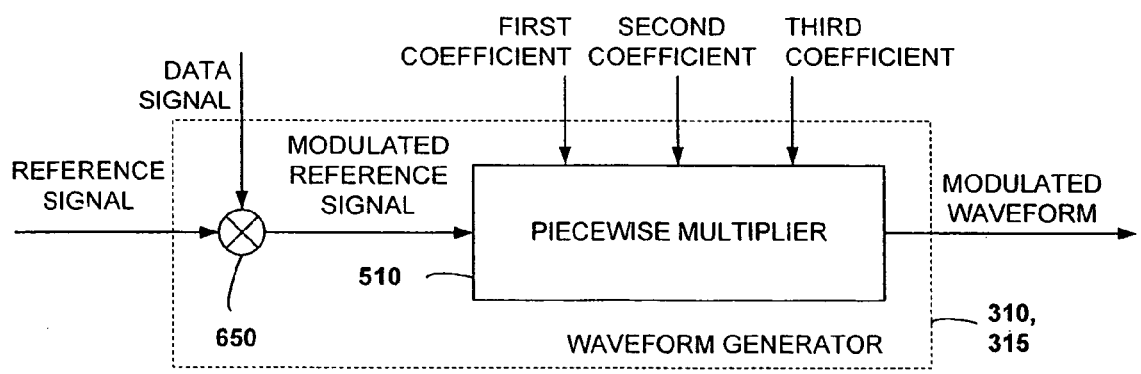
FIG. 6 is a block diagram of a waveform generator of FIG. 3, according to another disclosed embodiment of the present invention.
Figure 7:
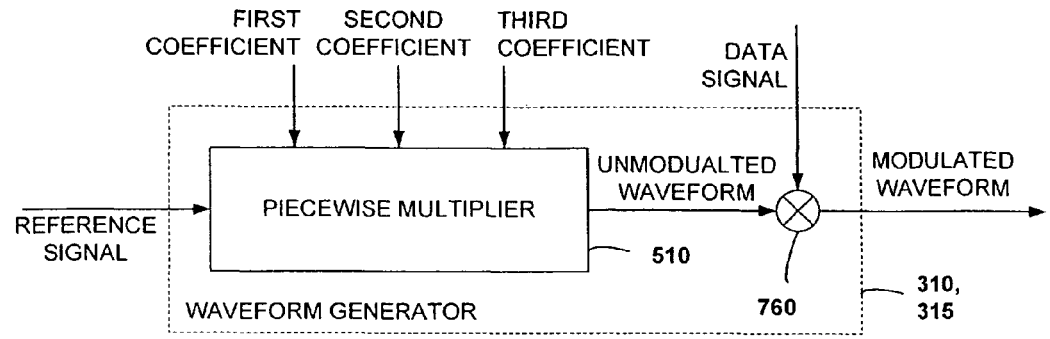
FIG. 7 is a block diagram of a waveform generator of FIG. 3, according to yet another disclosed embodiment of the present invention.
Figure 8:
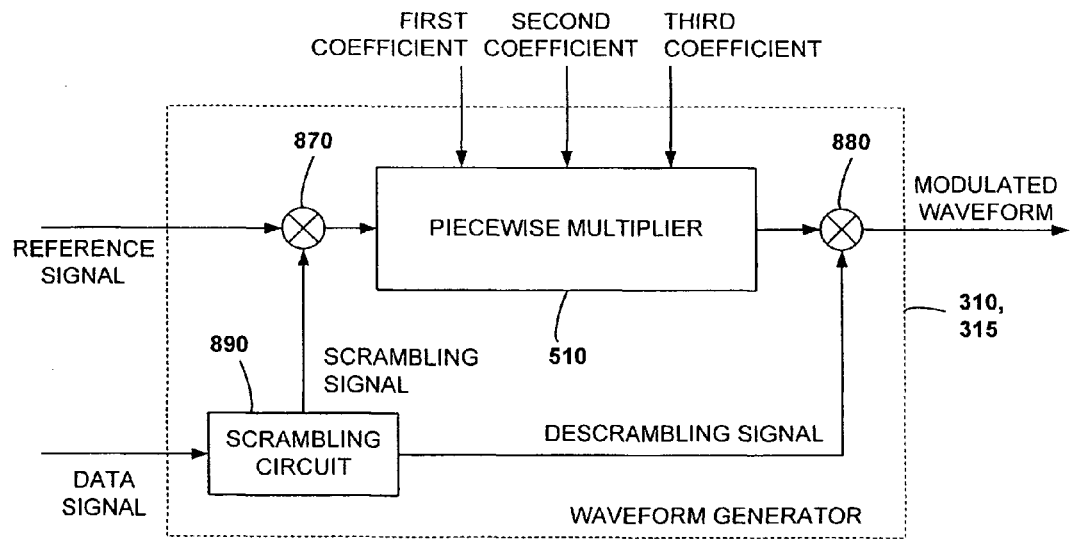
FIG. 8 is a block diagram of a waveform generator of FIG. 3, according to still another disclosed embodiment of the present invention.

FIGS. 5, 6, 7, and 8 are block diagrams of waveform generators according to different embodiments of the present invention. In particular, FIG. 5 is a block diagram of a waveform generator of FIG. 3, according to a one disclosed embodiment of the present invention; FIG. 6 is a block diagram of a waveform generator of FIG. 3, according to another disclosed embodiment of the present invention; FIG. 7 is a block diagram of a waveform generator of FIG. 3, according to yet another disclosed embodiment of the present invention; and FIG. 8 is a block diagram of a waveform generator of FIG. 3, according to still another disclosed embodiment of the present invention. Each of these embodiments is applicable to both a quadrature-phase waveform generator 310 and an in-phase waveform generator 315.

In the embodiment of FIG. 5, a data signal is modulated into the first, second, and third coefficients provided to the waveform generator 310, 315 prior to the piecewise multiplication process. As shown in FIG. 5, the waveform generator 310, 315 comprises a piecewise multiplier 510, and first, second, and third multipliers 520, 530, and 540.

The first multiplier 520 multiplies the data signal with a first coefficient to produce a modulated first coefficient. The second multiplier 530 multiplies the data signal with a second coefficient to produce a modulated second coefficient. The third multiplier 540 multiplies the data signal with a third coefficient to produce a modulated third coefficient.

The piecewise multiplier 510 accepts the first, second, and third modulated coefficients and performs a piecewise multiplication on the reference signal based on the modulated coefficients, as described above with respect to FIG. 1. Because data from the data signal is modulated into the modulated coefficients, the waveform resulting from the piecewise multiplication is a modulated waveform that has the data from the data signal modulated into it.

In the embodiment of FIG. 6, a data signal is modulated into the reference signal provided to the waveform generator 310, 315 prior to the piecewise multiplication process. As shown in FIG. 6, the waveform generator 310, 315 comprises a piecewise multiplier 510 and a multiplier 650.

The multiplier 650 multiplies the data signal with the reference signal to produce a modulated reference signal.

The piecewise multiplier 510 accepts the first, second, and third coefficients and performs a piecewise multiplication on the modulated reference signal based on the coefficients, as described above with respect to FIG. 1. Because data from the data signal is modulated into the modulated reference signal, the waveform resulting from the piecewise multiplication is a modulated waveform that has the data from the data signal modulated into it.

In the embodiment of FIG. 7, a data signal is modulated into the waveform produced by a piecewise multiplier 510 after the piecewise multiplication process. As shown in FIG. 7, the waveform generator 310, 315 comprises a piecewise multiplier 510 and a multiplier 760.

The piecewise multiplier 510 accepts the first, second, and third coefficients and performs a piecewise multiplication on the reference signal based on the coefficients, as described above with respect to FIG. 1. This process produces an unmodulated waveform.

The multiplier 760 multiplies the data signal with the unmodulated waveform to produce a modulated waveform.

In the embodiment of FIG. 8, a data signal whitened through a scrambling circuit to create a scrambling signal and a descrambling signal. The scrambling signal is mixed with the reference signal prior to piecewise multiplication and the descrambling signal is mixed with a scrambled waveform after the piecewise multiplication to produce a modulated waveform. As shown in FIG. 8, the waveform generator 310, 315 comprises a piecewise multiplier 510 and a first multiplier 870, a second multiplier 880, and a scrambling circuit 890.

The scrambling circuit 890 receives the data signal and uses the data signal to generate a scrambling signal and a descrambling signal that will produce the data signal when mixed together, but are each whitened. This can be implemented by having the scrambling circuit 890 delaying the data signal to produce an descrambling signal, and mixing the undelayed data with delayed data to create the scrambling signal.

The first multiplier 870 multiplies the reference signal by the scrambling signal to produce a scrambled reference signal.

The piecewise multiplier 510 accepts the first, second, and third coefficients and performs a piecewise multiplication on the scrambled reference signal based on the coefficients, as described above with respect to FIG. 1. This process produces an scrambled waveform.

The multiplier 760 multiplies the descrambling signal with the scrambled waveform to produce a modulated waveform.

Piecewise Multipliers

Figure 9:
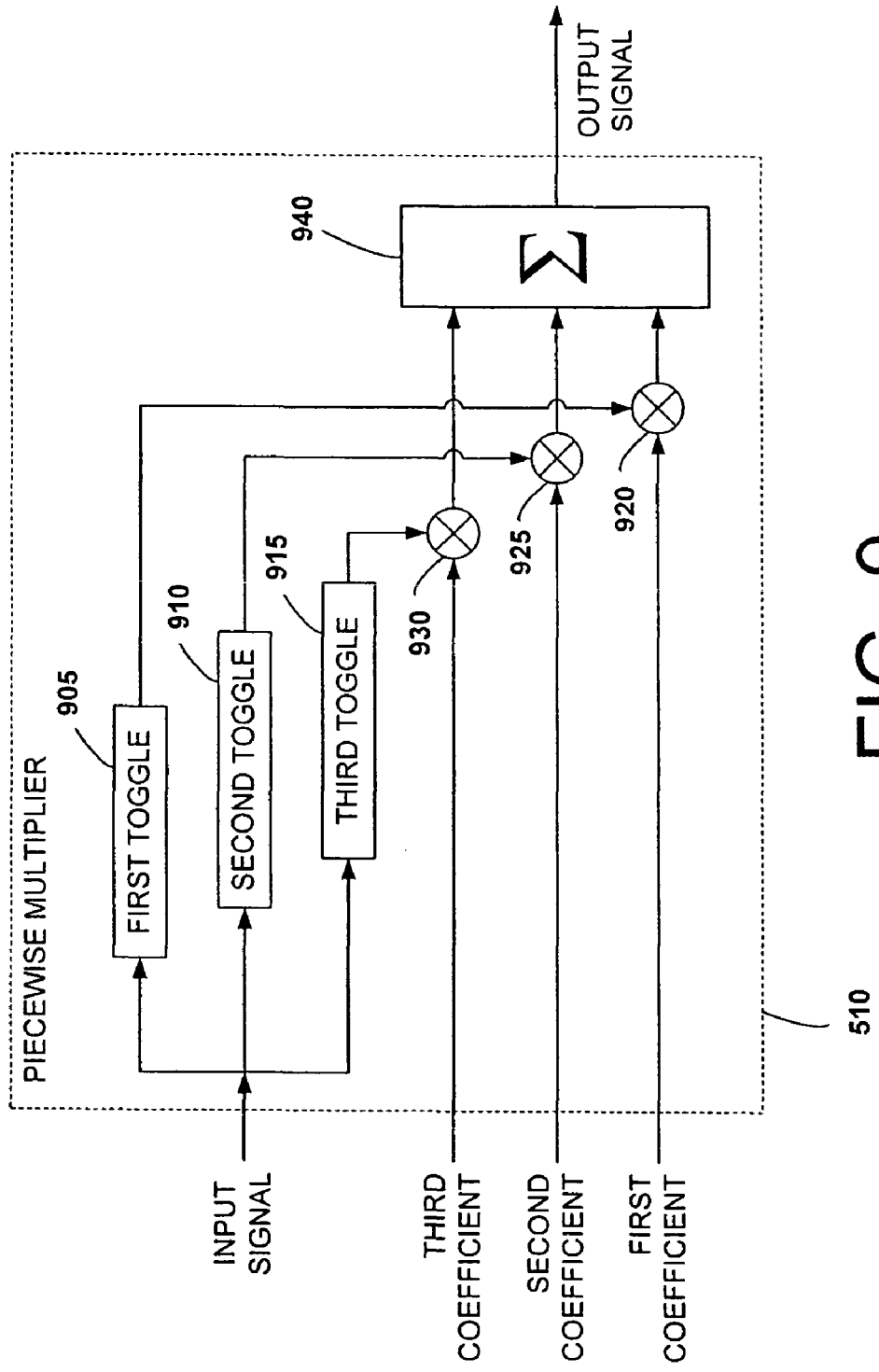
FIG. 9 is a block diagram of a piecewise multiplier of FIGS. 5 to 8, according to one disclosed embodiment of the present invention.
Figure 10:
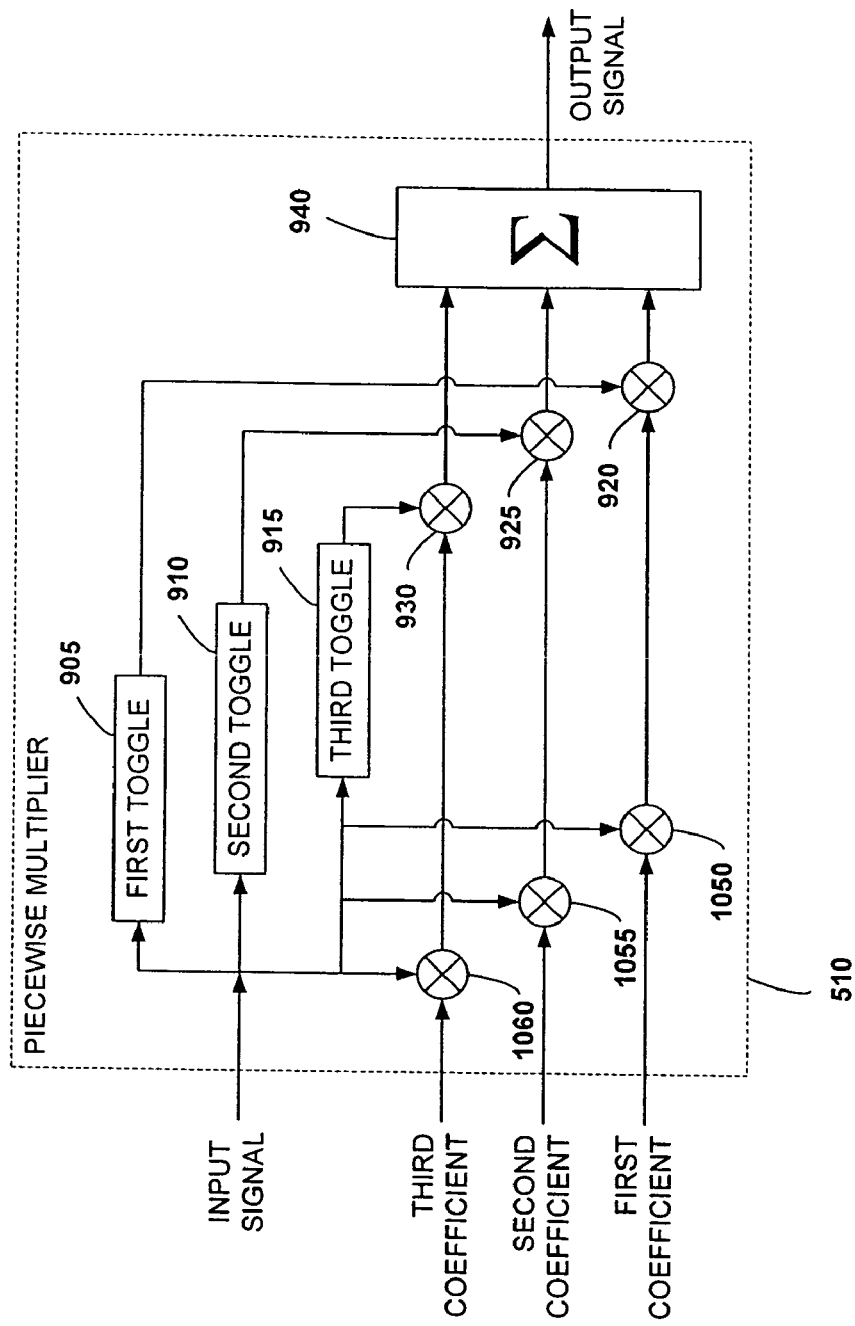
FIG. 10 is a block diagram of a piecewise multiplier of FIGS. 5 to 8, according to another disclosed embodiment of the present invention.

FIGS. 9 and 10 are block diagrams of piecewise multipliers according to two different embodiments of the present invention.

The embodiment of the piecewise multiplier 510 shown in FIG. 9 can be used to generate a square waveform for the modulated quadrature-phase and in-phase waveforms. As shown in FIG. 9, the piecewise multiplier 510 includes a first toggle 905, a second toggle 910, a third toggle 915, a first mixer 920, a second mixer 925, a third mixer 930, and a summer 940.

The first toggle 905 receives an input signal and uses the input signal as a clock to generate a first signal pattern. This first signal pattern is a step function that indicates when the piecewise multiplier should produce a half cycle segment multiplied by the first coefficient, and whether it should be positive or negative. The second toggle 910 receives an input signal and uses the input signal as a clock to generate a second signal pattern. This second signal pattern is a step function that indicates when the piecewise multiplier should produce a half cycle segment multiplied by the second coefficient, and whether it should be positive or negative. The third toggle 915 receives an input signal and uses the input signal as a clock to generate a third signal pattern. This third signal pattern is a step function that indicates when the piecewise multiplier should produce a half cycle segment multiplied by the third coefficient, and whether it should be positive or negative. The input signal thus operates as a clock signal for the first through third toggles 905, 910, and 915.

The toggles 905, 910, and 915 can be implemented in differential circuits such that generating their outputs involves simply choosing the positive output, the negative output, or neither according to a known pattern.

The input signal in the piecewise multiplier 510 may be a modulated or unmodulated reference signal, depending upon when modulation occurs in the waveform generator 310, 315. Regardless of which it is, however, the timing will be the same, meaning that the first, second, and third toggles 905, 910, and 915 will produce appropriate first, second, and third signal patterns. The only difference between these embodiments is that when the input signal is modulated, the first, second, and third patterns will be modulated according to the relevant data signal.

The first mixer 920 mixes the first signal pattern with the first coefficient to generate a first piecewise signal portion. The second mixer 925 mixes the second signal pattern with the second coefficient to generate a second piecewise signal portion. The third mixer 930 mixes the third signal pattern with the third coefficient to generate a third piecewise signal portion. The first, second, and third coefficients in the piecewise multiplier 510 may be a modulated or unmodulated coefficients, depending upon when modulation occurs in the waveform generator 310, 315.

The summer 940 adds the first, second, and third piecewise signal portions together to form the output signal. the output signal can be a modulated waveform or an unmodulated waveform, depending upon when modulation occurs in the waveform generator 310, 315.

The embodiment of the piecewise multiplier 510 shown in FIG. 10 can be used to generate a waveform for the modulated quadrature-phase and in-phase waveforms that reflects the signal produced by the signal generator 305 of FIG. 3. As shown in FIG. 10, the piecewise multiplier 510 includes a first toggle 905, a second toggle 910, a third toggle 915, a first mixer 920, a second mixer 925, a third mixer 930, a fourth mixer 1050, a fifth mixer 1055, a sixth mixer 1060, and a summer 940.

The first, second, and third toggles 905, 910, and 915 operate exactly as described with respect to FIG. 9.

The fourth multiplier 1050 multiplies the first coefficient by the input signal to generate a first modified input signal. The fifth multiplier 1060 multiplies the second coefficient by the input signal to generate a second modified input signal. The sixth multiplier 1050 multiplies the third coefficient by the input signal to generate a third modified input signal. In this case the input signal operates as a shaping signal to make the first through third modified signals have the proper shape.

The first mixer 920 mixes the first signal pattern with the first modified input signal to generate a first piecewise signal portion. The second mixer 925 mixes the second signal pattern with the second modified input signal to generate a second piecewise signal portion. The third mixer 930 mixes the third signal pattern with the third modified input signal to generate a third piecewise signal portion. The first, second, and third modified input signals in the piecewise multiplier 510 may be a modulated or unmodulated coefficients, depending upon when modulation occurs in the waveform generator 310, 315.

The summer 940 adds the first, second, and third piecewise signal portions together to form the output signal. the output signal can be a modulated waveform or an unmodulated waveform, depending upon when modulation occurs in the waveform generator 310, 315.

By multiplying the first, second, and third coefficients by the input signal to create first, second, and third modified input signals prior to multiplying these modified input signals by respective signal patterns, the piecewise multiplier 510 provides that the resulting output signal (whether a modulated or unmodulated waveform) will have the same signal type as the input signal (i.e., sinusoidal, square, triangular, etc.)

Although in the embodiment of FIG. 10, the same input signal is shown as serving as both a clock signal for the first through third toggles 905, 910, and 915, and a shaping signal for the fourth through sixth mixers 1050, 1055, and 1060, separate signals could be used in alternate embodiments In an alternate embodiment the polarity of the coefficients A, B, C, A', B', and C' can be modified according to a known pattern such that when mixed with the toggle signals they generate the proper waveforms.

Operation of the QPSK Signal Generation Circuit

Figure 11:
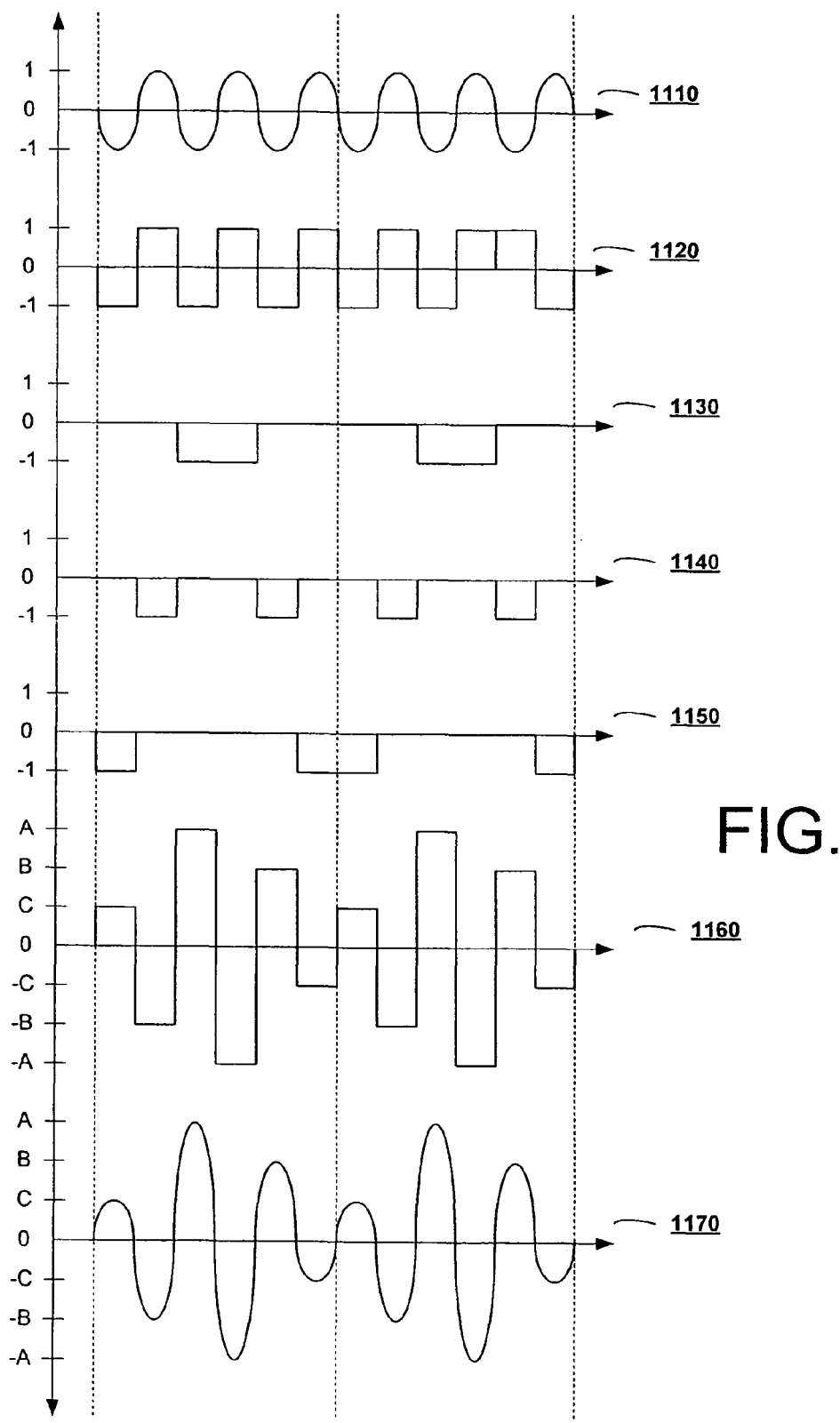
FIG. 11 is a graph of the signals in the piecewise multiplier of FIG. 7 in a quadrature-phase path, according to a disclosed embodiment of the present invention.

FIG. 11 is a graph of the signals in the piecewise multiplier of FIG. 7 in a quadrature-phase path, according to a disclosed embodiment of the present invention. FIG. 11 is a graph of the signals in the piecewise multiplier of FIG. 7 in an in-phase path, according to a disclosed embodiment of the present invention.

As shown in FIG. 11, a cosine wave 1110 and a square wave 1120 are two exemplary quadrature-phase reference signals (i.e., input signals to the piecewise multiplier 510 in the quadrature-phase waveform generator 310). One of these signals 1110 or 1120 could be provided to the first, second, and third toggles 905, 910, and 915 in the piecewise multiplier 510 as a clock signal.

In response to the input signal (either the cosine wave 1110 or square wave 1120 in this embodiment), the first, second, and third toggles 905, 910, and 915 will generate first, second, and third toggle signals 1130, 1135, and 1140, respectively. These toggle signals are square waves that have a positive value +1 at times corresponding to a half-cycle in which the resulting quadrature-phase waveform should have a magnitude The first toggle signal 1130 will be multiplied by the first coefficient A and a shaping signal; the second toggle signal 1135 will be multiplied by the second coefficient B and a shaping signal; and third toggle signal 1140 will be multiplied by the third coefficient C and a shaping signal; and the three signals will be added together to create. This shaping signal could be the input signal (e.g., the sine wave 1110 or the square wave 1120 in the embodiment of FIG. 11), or any other appropriate signal with the same phase and frequency as the input signal.

As shown in FIG. 11, a set of square quadrature-phase waveforms 1160 are shown for when the shaping signal is the square wave 1120, and a set of sinusoidal quadrature-phase waveforms 1170 are shown for when the shaping signal is the cosine wave 1110.

Figure 12:
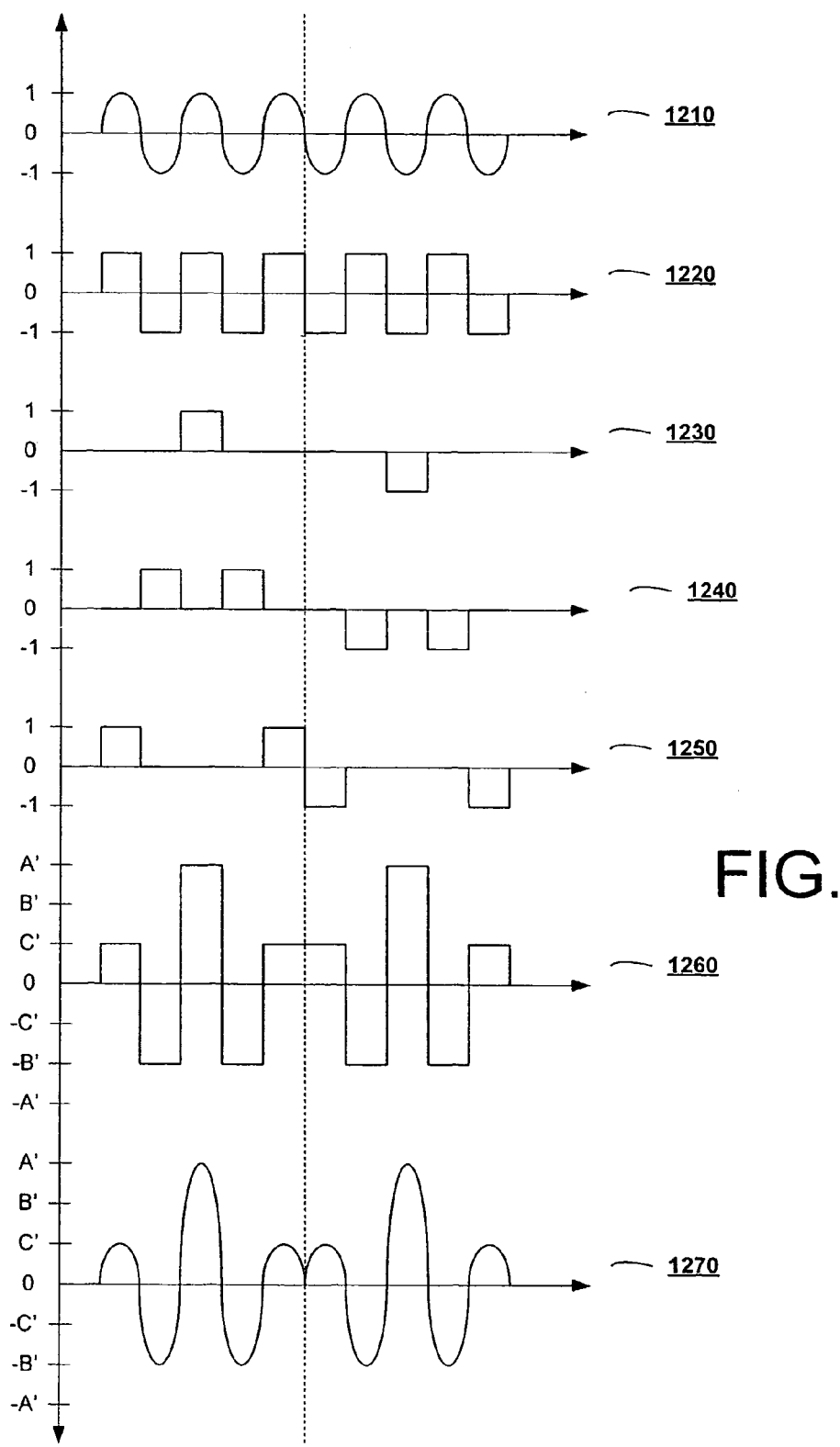
FIG. 12 is a graph of the signals in the piecewise multiplier of FIG. 7 in an in-phase path, according to a disclosed embodiment of the present invention.

As shown in FIG. 12, a sine wave 1210 and a square wave 1220 are two exemplary quadrature-phase reference signals (i.e., input signals to the piecewise multiplier 510 in the quadrature-phase waveform generator 310). One of these signals 1210 or 1220 could be provided to the first, second, and third toggles 905, 910, and 915 in the piecewise multiplier 510 as a clock signal.

In response to the input signal (either the sine wave 1210 or square wave 1220 in this embodiment), the first, second, and third toggles 905, 910, and 915 will generate first, second, and third toggle signals 1230, 1235, and 1240, respectively. These toggle signals are square waves that have a positive value +1 at times corresponding to a half-cycle in which the resulting quadrature-phase waveform should have a magnitude The first toggle signal 1230 will be multiplied by the first coefficient A and a shaping signal; the second toggle signal 1235 will be multiplied by the second coefficient B and a shaping signal; and third toggle signal 1240 will be multiplied by the third coefficient C and a shaping signal; and the three signals will be added together to create. This shaping signal could be the input signal (e.g., the sine wave 1210 or the square wave 1220 in the embodiment of FIG. 12), or any other appropriate signal with the same phase and frequency as the input signal.

As shown in FIG. 12, a set of square quadrature-phase waveforms 1260 are shown for when the shaping signal is the square wave 1220, and a set of sinusoidal quadrature-phase waveforms 1270 are shown for when the shaping signal is the sine wave 1210.

In some alternate embodiments the toggle signals 1130, 1135, 1140, 1230, 1235, and 1240 modulated by the proper coefficients can be added together to directly create a waveform signal 1160 or 1260. In this case, the polarity of the segments of the toggle signals 1130, 1135, 1140, 1230, 1235, and 1240 will be adjusted so that their sum gives the proper waveform shape to account for the fact that they are not modulated by a shaping signal.

In some alternate embodiments the specific polarities of one full iteration of toggle signals can vary in polarity, providing that the quadrature-phase and in-phase waveforms maintain their proper shape. In some embodiments some iterations of the quadrature-phase and in-phase waveforms could be flipped. All that is necessary in these embodiments is for the transmitter to be aware of the pattern if waveform inversions so that the transmitted data can be encoded properly such that the resulting data stream decoded from the QPSK signals will contain the transmitted data.

In addition, although the magnitude of the first, second, and third Q-toggle signals 1130, 1135, and 1140 and the first, second, and third I-toggle signals 1230, 1235, and 1240 are shown as being equal to 1, the magnitudes of the first, second, and third Q-coefficients are shown as being A, B, and C, and the magnitudes of the first, second, and third I-coefficients are shown as being A', B', and C', the exact values could be scaled as necessary. For example, the magnitude of the first, second, and third Q-toggle signals 1130, 1135, and 1140 and the and the first, second, and third I-toggle signals 1230, 1235, and 1240 could be called ±X and the magnitudes of the first, second, and third Q-coefficients and the first, second, and third I-coefficients are shown as being A', B', and C' could be called $$\frac{A}{X}, \frac{B}{X}, \frac{C}{X}, \frac{A'}{g \cdot X}, \frac{B'}{g \cdot X}, \text{ and } \frac{C'}{g \cdot X},$$

where g is a controllable scaling factor. The value of X could then be set to give the proper absolute amplitude to make the signals orthogonal, while the value of g could be set to make the signals have equal energy.

The signals shown in FIGS. 11 and 12 are with respect to the embodiment of FIG. 7 in which data modulation is performed after piecewise multiplication. The signals for the embodiments of FIGS. 5 and 6 would be similar except that the individual waveforms would be modulated according to the data on the respective quadrature-phase and in-phase data signals.

Figure 13:
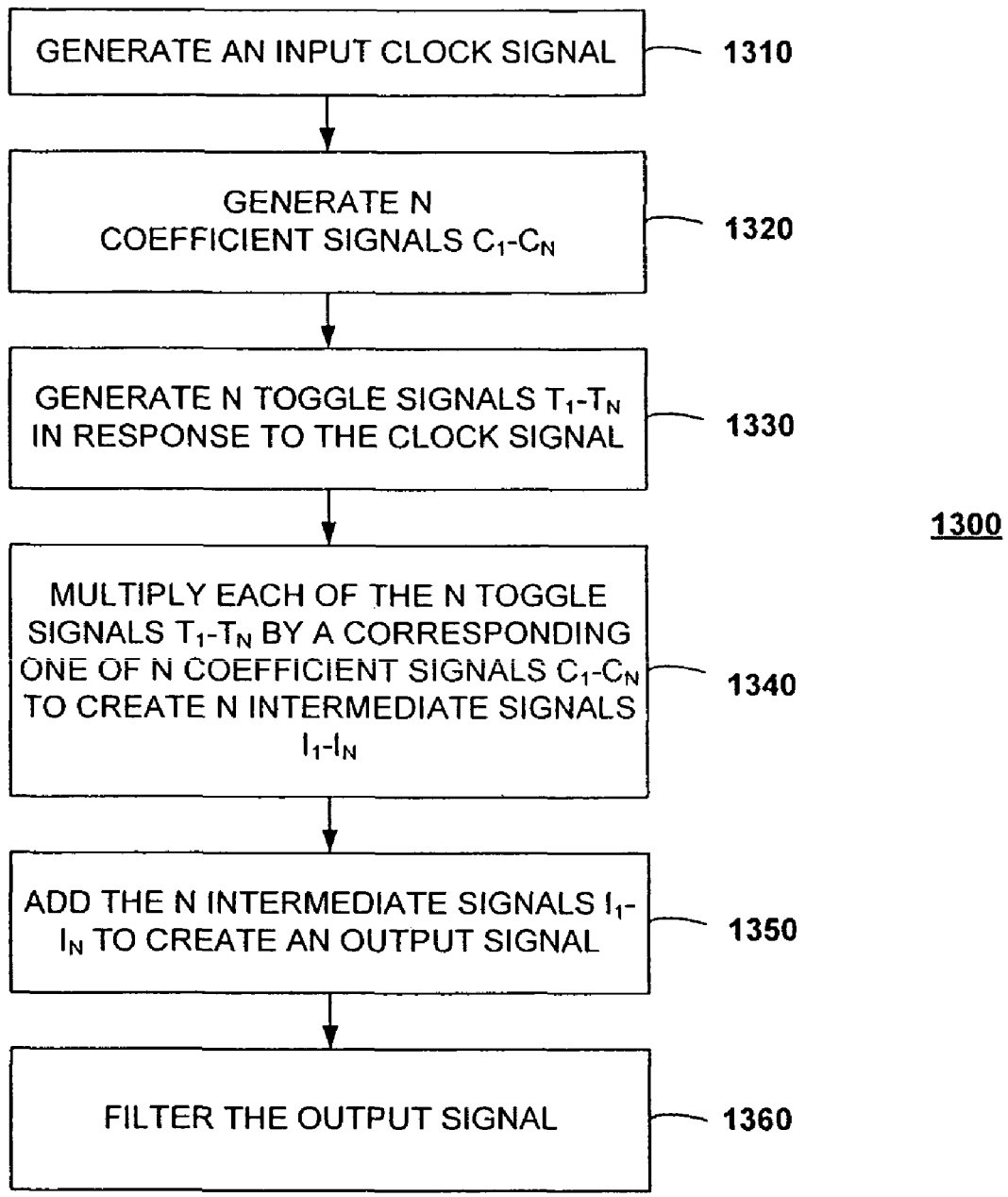
FIG. 13 is a flow chart of a process for generating a QPSK signal for either the in-phase or quadrature-phase path, according to a first disclosed embodiment of the present invention.

FIG. 13 is a flow chart of a process for generating a QPSK signal for either the in-phase or quadrature-phase path, according to a first disclosed embodiment of the present invention. In this embodiment, a plurality of toggle signals are used to directly generate a shape for the QPSK waveforms.

As shown in FIG. 13, the process 1300 begins by having a device generate a clock signal. (1310) This signal has the frequency and phase of the desired QPSK waveforms.

The device then generates N coefficient signals $C_1$-$C_N$ that will be used to create the QPSK waveforms. (1320) The values of these coefficient signals $C_1$-$C_N$ are chosen in conjunction with a basic QPSK waveform shape to provide QPSK signals that meet the requirements of equal energy and orthogonality set forth in Equations (1) and (2).

The device then generates N toggle signals $T_1$-$T_N$ in response to the clock signal. (1330) These toggle signals $T_1$-$T_N$ indicate when a piecewise portion of a waveform should be multiplied by a corresponding one of the coefficient signals $C_1$-$C_N$. Each piecewise portion of respective toggle signals $T_1$-$T_N$ is of a desired shape and polarity for the corresponding portion of the resulting in-phase or quadrature-phase waveform. For example, $T_1$-$T_N$ could be square waves having a positive value when the waveform should have a positive value, and having a negative value when the waveform should have a negative value, each of the toggle signals $T_1$-$T_N$ being non-zero when the piecewise segment of the waveform should be multiplied by a corresponding one of the coefficient signals $C_1$-$C_N$.

The device then multiplies each of the N toggle signals $T_1$-$T_N$ with a corresponding one of the N coefficient signals $C_1$-$C_N$ to generate N intermediate signals $I_1$-$I_N$ (1340) Each of the intermediate signals $I_1$-$I_N$ represents a portion of the final waveform that has a magnitude of the corresponding coefficient signal $C_1$-$C_N$.

The device then adds together all of the intermediate signals $I_1$-$I_N$ to form an output signal. (1350), which can then be passed through a filter (1360) to remove any undesired spectrum in the waveforms arising from any discontinuities.

Figure 14:
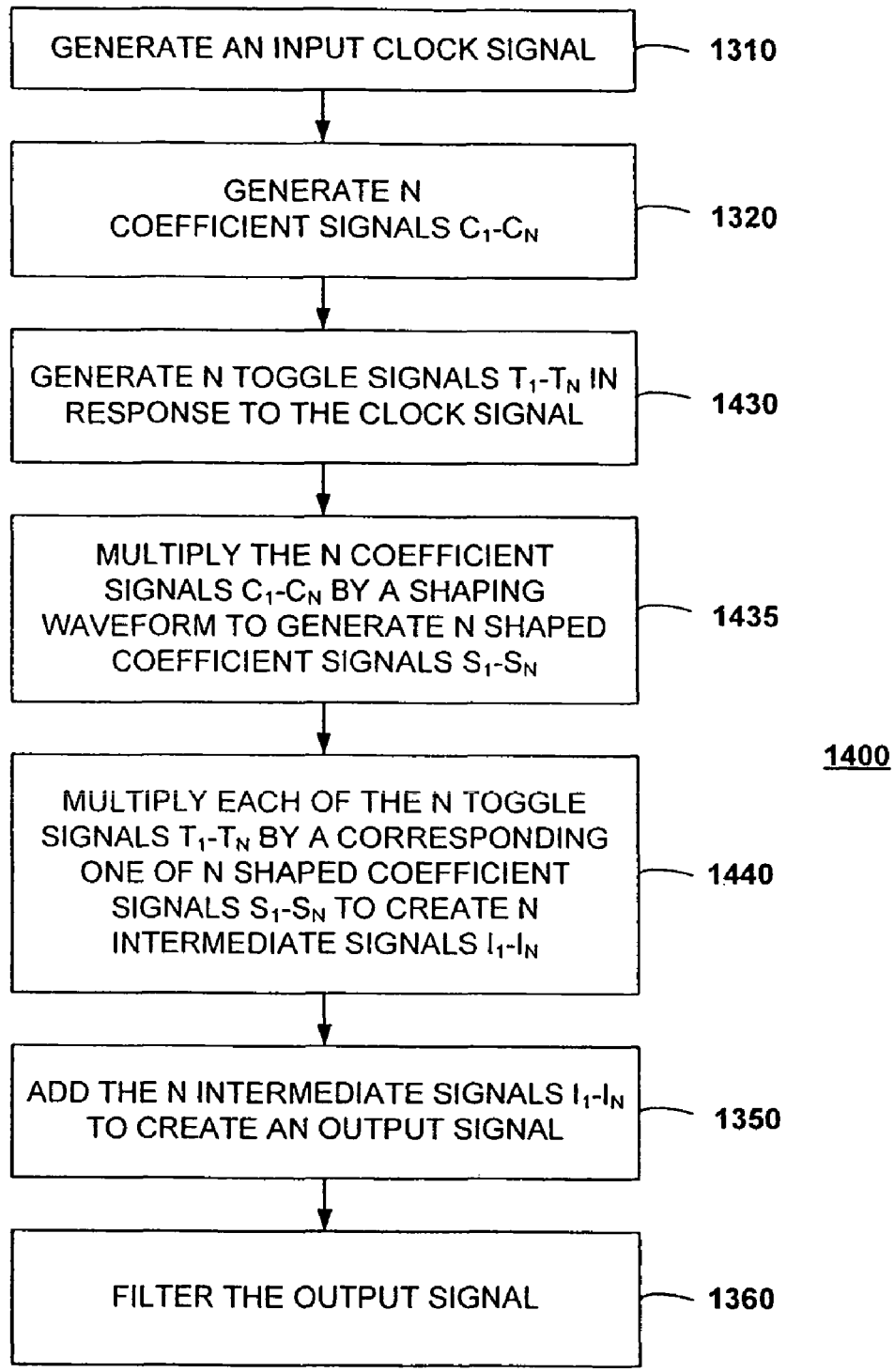
FIG. 14 is a flow chart of a process for generating a QPSK signal for either the in-phase or quadrature-phase path, according to a second disclosed embodiment of the present invention.

FIG. 14 is a flow chart of a process for generating a QPSK signal for either the in-phase or quadrature-phase path, according to a second disclosed embodiment of the present invention.

As shown in FIG. 14, the process 1400 begins by having a device generate a clock signal. (1310) and generate N coefficient signals $C_1$-$C_N$ (1320), as described above with respect to FIG. 13.

The device then generates N toggle signals $T_1$-$T_N$ in response to the clock signal. (1430) These toggle signals $T_1$-$T_N$ indicate when a piecewise portion of a waveform should be multiplied by a corresponding one of the coefficient signals $C_1$-$C_N$. However, since the toggle signals $T_1$-$T_N$ will ultimately be combined with a shaping signal, their polarity should be chosen such that the sections of the resulting waveform will have the desired polarities. For example, if the sections of the resulting waveform should have the same polarities as corresponding sections of a shaping waveform, the toggle signals $T_1$-$T_N$ could be square waves having a positive value a piecewise segment of the waveform should be multiplied by a corresponding one of the coefficient signals $C_1$-$C_N$.

The device then multiplies each of the coefficient signals $C_1$-$C_N$ by a shaping signal to generate N shaped coefficient signals $S_1$-$S_N$. (1435). The shaping signal can be a sinusoidal signal, a square wave signal, a triangular wave signal, or any other signal that can be broken up into appropriate segments. Each of the shaped coefficient signals $S_1$-$S_N$ are copies of the basic shaped signal scaled by the appropriate coefficient signal $C_1$-$C_N$.

The device then multiplies each of the N toggle signals $T_1$-$T_N$ with a corresponding one of the N shaped coefficient signals $S_1$-$S_N$ to generate N intermediate signals $I_1$-$I_N$. (1440)

Each of the intermediate signals $I_1$-$I_N$ represents a portion of the final waveform that has a magnitude of the corresponding coefficient signal $C_1$-$C_N$.

The device then adds together all of the intermediate signals $I_1$-$I_N$ to form an output signal. (1350), which can then be passed through a filter (1360) to remove any undesired spectrum in the waveforms arising from any discontinuities.

Determination of Coefficient Values

Figure 15:
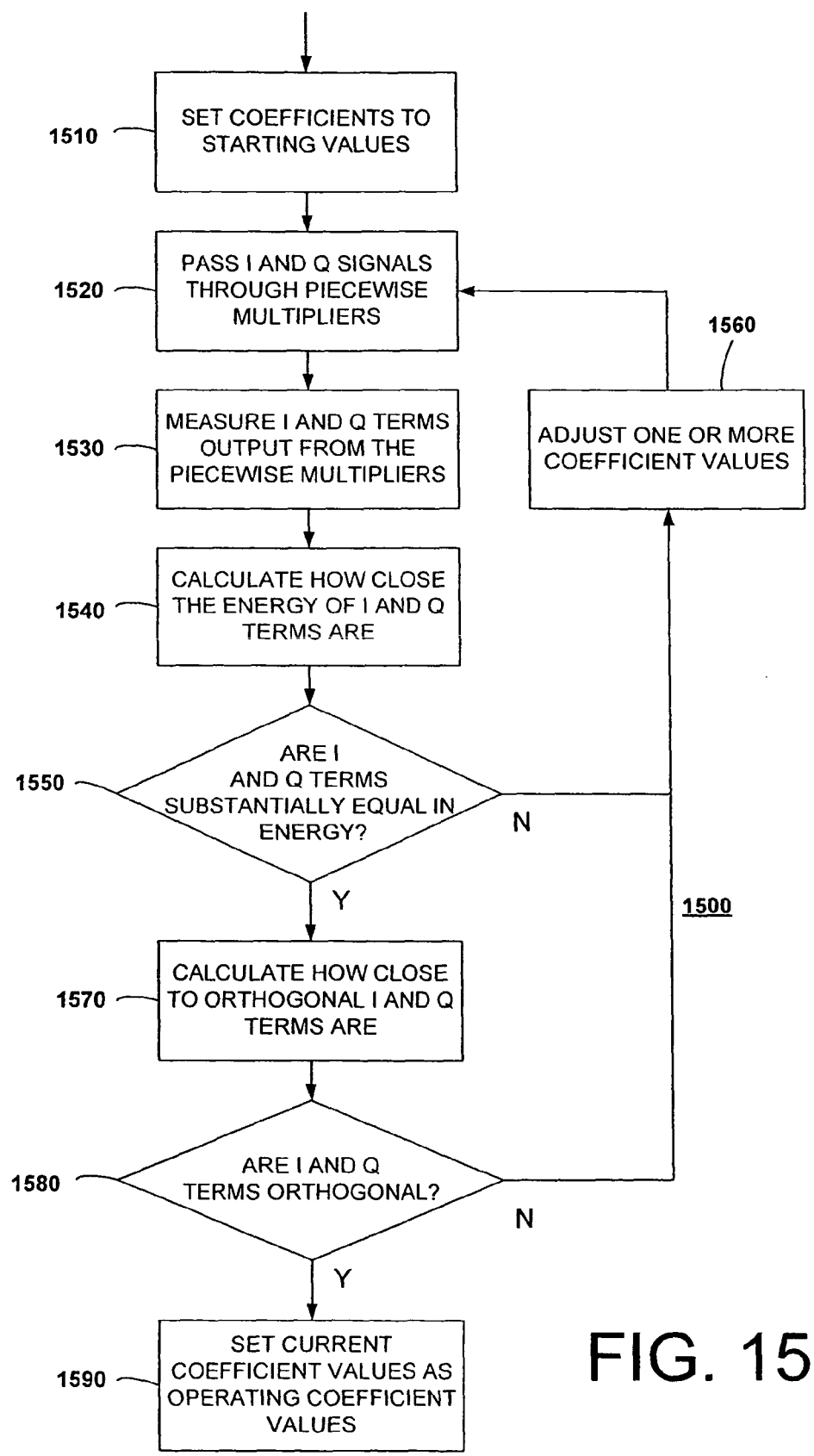
FIG. 15 a flow chart of a process for determining coefficients in a QPSK signal generating circuit, according to a disclosed embodiment of the present invention.

FIG. 15 a flow chart of a process for determining coefficients in a QPSK signal generating circuit, according to a disclosed embodiment of the present invention. As shown in FIG. 15, the process 1500 begins by having a device having an I and Q generation circuit 300 set the coefficients in the various coefficient generators 330, 335, 340, 345, 450, 355 to starting values. (1510) If the embodiment of FIG. 4 is used for the coefficient generators 330, 335, 340, 345, 450, 355, one way this can be accomplished is to set the coarse control signals to starting values.

The device then passes I and Q data signals through the waveform generators 310 and 315 (1520), and measures the I and Q signals output from the piecewise multipliers 310 and 315. (1530) In an embodiment that employs quadrature-phase and in-phase filters 320 and 325, this could be a measurement of the output of the QPSK signals output from the quadrature-phase and in-phase filters 320 and 325.

Based on these QPSK outputs, the device calculates how close the energy of the I and Q signals are. (1540) If it determines that they are not substantially equal in energy (i.e., they do not meet the requirements of Equation (2) within an acceptable tolerance (1550), then the device adjusts one or more of the coefficient values (1560) and again passes I and Q data signals through the piecewise multipliers 310 and 315. (1520)

If the device determines that the I and Q signals are substantially equal in energy (1550), the device then calculates how close the energy of the I and Q signals are to being orthogonal. (1570) If it determines that they are not substantially orthogonal (i.e., they do not meet the requirements of Equation (1) within an acceptable tolerance (1580), then the device adjusts one or more of the coefficient values (1560) and again passes I and Q data signals through the piecewise multipliers 310 and 315. (1520)

If the device determines that the I and Q signals are substantially orthogonal (1580), then the device sets the current coefficient values as operating values for the system. (1590)

Although the exemplary method shown in FIG. 14 shows that the determination of whether the I and Q signals have equal energy takes place before the determination of whether the I and Q signals are orthogonal, the order of these could be switched in alternate embodiments, or they could be performed simultaneously. Regardless, there will be an iterative process by which the coefficients are adjusted until the requirements of equal energy and orthogonality are met within acceptable tolerances.

Although this method describes the device as making the various determinations and coefficient changes, these could be performed by a user of the device. In various embodiments, this calibration process can be performed automatically as part of a calibration process, or can be directed by a user who manually changes the coefficient values.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for generating one or more waveforms, comprising:
    generating a first toggle signal at a first signal-generating circuit in response to a first clock signal, the first toggle signal having one of a first positive shape, a null shape, and a first negative shape for each cycle of the first clock signal;
    multiplying the first toggle signal by a first coefficient signal to create a first intermediate signal;
    generating a second toggle signal at a second signal-generating circuit in response to the first clock signal, the second toggle signal having one of a second positive shape, the null shape, and a second negative shape for each cycle of the first clock signal;
    multiplying the second toggle signal by a second coefficient signal to create a second intermediate signal; and
    generating a first output signal by adding the first intermediate signal and the second intermediate signal together,
    wherein the first and second positive shapes are each a positive square-wave half cycle,
    wherein the first and second negative shapes are each a negative square-wave half cycle,
    wherein when the first toggle signal has one of the first positive shape or the first negative shape, the second toggle signal has the null shape, and
    wherein when the second toggle signal has one of the second positive shape or the second negative shape, the first toggle signal has the null shape.

2. A method for generating one or more waveforms, as recited in claim 1, further comprising:
    generating a third toggle signal at a third signal-generating circuit in response to a second clock signal, the third toggle signal having one of a third positive shape, the null shape, and a third negative shape for each cycle of the second clock signal;
    multiplying the third toggle signal by a third coefficient signal to create a third intermediate signal;
    generating a fourth toggle signal in response to the second clock signal, the fourth toggle signal having one of a fourth positive shape, the null shape, and a fourth negative shape for each cycle of the second clock signal;
    multiplying the fourth toggle signal by a fourth coefficient signal to create a fourth intermediate signal; and
    generating a second output signal by adding the third intermediate signal and the fourth intermediate signal together;
    wherein the third positive shape is a positive square-wave half cycle,
    wherein the third negative shape is a negative square-wave half cycle, wherein when the third toggle signal has one of the third positive shape or the third negative shape, the fourth toggle signal has the null shape, and wherein when the fourth toggle signal has one of the fourth positive shape or the fourth negative shape, the third toggle signal has the null shape.

3. A method for generating one or more waveforms, as recited in claim 2, wherein the first output signal and the second output signal are one of orthogonal or approximately orthogonal with respect to each other, and wherein the first output signal has a first signal energy that is nominally equal to a second signal energy of the second output signal.

4. A method for generating one or more waveforms, as recited in claim 1, wherein the first clock signal is one of: an in-phase reference signal, and a quadrature-phase reference signal.

5. A method for generating one or more waveforms, as recited in claim 1, further comprising one of: modulating an in-phase reference signal with an in-phase data signal to generate the first clock signal, and modulating a quadrature-phase reference signal with a quadrature-phase data signal to generate the first clock signal.

6. A method for generating one or more waveforms, as recited in claim 1, further comprising:

multiplying a data signal by a first coefficient value to generate the first coefficient signal; and multiplying the data signal by a second coefficient value to generate the second coefficient signal.

7. A method for generating one or more waveforms, as recited in claim 1, further comprising:

generating a third toggle signal in response to the first clock signal, the third toggle signal having one of a third positive shape, the null shape, and a third negative shape for each cycle of the input signal; and multiplying the third toggle signal by a third coefficient signal to create a third intermediate signal, wherein the generating of the output signal is performed by adding the first, second, and third intermediate signals together wherein the third negative shape is a negative square-wave half cycle, wherein when the first toggle signal has one of the first positive shape or the first negative shape, or the second toggle signal has one of the second positive shape or the second negative shape, the third toggle signal has the null shape, and wherein when the third toggle signal has one of the third positive shape or the third negative shape, the first and second toggle signals have the null shape.

8. A method for generating one or more waveforms, as recited in claim 1, wherein the null shape is a zero-value signal.

9. A method for generating one or more waveforms, as recited in claim 8, further comprising:

multiplying a sinusoidal wave by a first coefficient value to generate the first coefficient signal; and multiplying the sinusoidal wave by a second coefficient value to generate the second coefficient signal.

10. A method for generating one or more waveforms, as recited in claim 1, further comprising passing the first output signal through a filter to provide a filtered signal.

11. A method for generating one or more waveforms, as recited in claim 1, further comprising modulating the first output signal with a data signal to provide a modulated signal.

12. A method for generating one or more waveforms, as recited in claim 1, wherein the method is implemented in an integrated circuit.

13. A method for generating one or more waveforms, comprising:

generating a first toggle signal in response to a first clock signal, the first toggle signal having one of a first positive shape, a null shape, and a first negative shape for each cycle of the first clock signal;

multiplying the first toggle signal by a first coefficient signal to create a first intermediate signal;

generating a second toggle signal in response to the first clock signal, the second toggle signal having one of a second positive shape, the null shape, and a second negative shape for each cycle of the first clock signal;

multiplying the second toggle signal by a second coefficient signal to create a second intermediate signal; and generating a first output signal by adding the first intermediate signal and the second intermediate signal together wherein when the first toggle signal has one of the first positive shape or the first negative shape, the second toggle signal has the null shape, and wherein when the second toggle signal has one of the second positive shape or the second negative shape, the first toggle signal has the null shape.

14. A method for generating one or more waveforms, as recited in claim 13, wherein the null shape is a zero-value signal.

* * * * *